United States Patent [19]

Tournier

[11] Patent Number: 5,407,169
[45] Date of Patent: Apr. 18, 1995

[54] CONTROLLABLE SUPPORT ELEMENT

[75] Inventor: Pascal Tournier, Orvault, France

[73] Assignee: Draftex Industries Limited, Edinburgh, Scotland

[21] Appl. No.: 143,466

[22] Filed: Oct. 26, 1993

[30] Foreign Application Priority Data

Oct. 28, 1992 [GB] United Kingdom ............... 9222656

[51] Int. Cl.⁶ ......................................... F16M 13/00
[52] U.S. Cl. ................................. 248/550; 248/562; 248/636; 267/140.11
[58] Field of Search ............... 248/562, 566, 636, 550; 267/140.11, 219, 140.14, 140.13; 180/300

[56] References Cited

U.S. PATENT DOCUMENTS

| | | |
|---|---|---|
| 4,756,513 | 7/1988 | Carlson et al. |
| 4,840,358 | 6/1989 | Hoying et al. |
| 4,886,251 | 12/1989 | Häussermann |
| 4,901,986 | 2/1990 | Smith |
| 5,215,293 | 6/1993 | Muramatsu et al. |

FOREIGN PATENT DOCUMENTS

| | | |
|---|---|---|
| 0115417 | 8/1984 | European Pat. Off. |
| 0185855 | 7/1986 | European Pat. Off. |
| 0218202 | 4/1987 | European Pat. Off. |
| 0262544 | 4/1988 | European Pat. Off. |
| 2573156 | 11/1985 | France |
| 2663706 | 6/1991 | France |
| 2087512 | 5/1982 | United Kingdom |
| 2168778 | 6/1986 | United Kingdom |

OTHER PUBLICATIONS

Japanese Patent Abstract Vol. 11 No. 76 CM-569) March 7, 1987; and Japanese Specification No. 61-233237 (Kuze)
Japanese Patent Abstract Vol. 8, No. 143 (M-306) July 4, 1984, and Japanese Patent Publication No. 59-40032 (Tsuchiya)

*Primary Examiner*—J. Franklin Foss
*Attorney, Agent, or Firm*—Leydig, Voit & Mayer

[57] ABSTRACT

An engine mount comprises a relatively stiff elastomeric member having an interior defining a first chamber containing hydraulic liquid. The elastomeric member is attached both to the engine and to the vehicle body. A flexible wall defines a second chamber and the two chambers are connected by a restricted channel. Engine vibration is transmitted to the liquid in the first chamber via the elastomeric member, and damping takes place because of the resistance to the flow of liquid between the two chambers or because of oscillation of the mass of the liquid in the restricted channel. In addition, a flexible membrane is supported by the interior wall of the elastomeric member and urged against this wall by a leaf spring, and the air pressure between the interior wall of the elastomeric member and the membrane is variable. When the air pressure is increased, the membrane moves away from the wall of the elastomeric member against the spring so that the first chamber is now partially defined by a flexible wall, thus reducing the damping effect and the stiffness.

18 Claims, 5 Drawing Sheets

CONTROLLABLE SUPPORT ELEMENT

BACKGROUND OF THE INVENTION

The invention relates to a controllable support element. Embodiments of the invention to be described in more detail below are in the form of controllable anti-vibration support elements such as for mounting between the engine and the body of a motor vehicle so as to damp vibratory movement of the engine and prevent or reduce the transmission of such vibrations to the body.

SUMMARY OF THE INVENTION

According to the invention, there is provided a vibration-damping support for acting between two members between which it is connected in use so as to dampen transmission of vibrations between them, comprising wall means defining chamber means for containing hydraulic fluid, means responsive to the said vibrations for acting on the liquid within the chamber means so as to tend to move it, damping means resisting such movement of the fluid whereby to provide damping of the vibrations, a portion of the wall means being flexible to affect the magnitude of the vibration damping, and control means for controllably varying the flexibility of the said flexible portion of the wall means whereby to vary the magnitude of the vibration damping, the control means comprising means resiliently urging the said portion of the wall means against a substantially rigid surface, and pressure means for applying controllable gas pressure between the rigid surface and the adjacent surface of the said portion of the wall means.

According to the invention, there is also provided a vibration-damping support for acting between two members between which it is connected in use so as to dampen transmission of vibrations between them, comprising wall means defining chamber means for containing hydraulic fluid, means responsive to the said vibrations for acting on the liquid within the chamber means so as to tend to move it, damping means resisting such movement of the fluid whereby to provide damping of the vibrations, control means comprising a closed-off compartment within the chamber means and having a flexible wall portion, and means for controlling the gas pressure within the compartment, whereby to affect the magnitude of the vibration damping.

According to the invention, there is further provided a controllable engine mount for a vehicle for damping the transmission of vibrations between the engine and the body of the vehicle, comprising first and second fixtures for respective connection to the engine and the body; a hollow member having an internal conically shaped surface made of relatively stiff material the apex of which is connected to one of the fixtures and the base of which is connected to the other thereof; a flexible wall closing off the base of the conically shaped member so as to define therewith a chamber for filling with hydraulic liquid; separating means in the chamber and between the conically shaped member and the flexible wall to separate the chamber into first and second chamber portions the first of which is positioned between the separating means and the conically shaped member and the second of which is positioned between the separating means and the flexible wall; the separating means including a hydraulic fluid passageway connecting the two chamber portions and including fluid damping means such that flexing of the conically shaped member in dependence on vibrations causes movement of liquid between the two chamber portions which movement is restricted by the damping means thereby damping the vibrations; the volume of the first chamber portion being at least partially defined by a flexible membrane having one of its surfaces in contact with the fluid; the flexible membrane being mounted with its opposite surface adjacent to the said conically shaped surface and urged thereagainst by resilient spring means; and control means for applying a variable gas pressure between the conically shaped surface and the membrane so as to vary the flexibility of the membrane and thus to control the damping effect produced by movement of the hydraulic fluid and the stiffness.

DESCRIPTION OF THE DRAWINGS

Controllable anti-vibration support elements embodying the invention will now be described, by way of example only, with reference to the accompanying diagrammatic drawings in which.

DESCRIPTION OF PREFERRED EMBODIMENTS

In the various Figures, similar reference numerals indicate similar parts.

Figure 1:
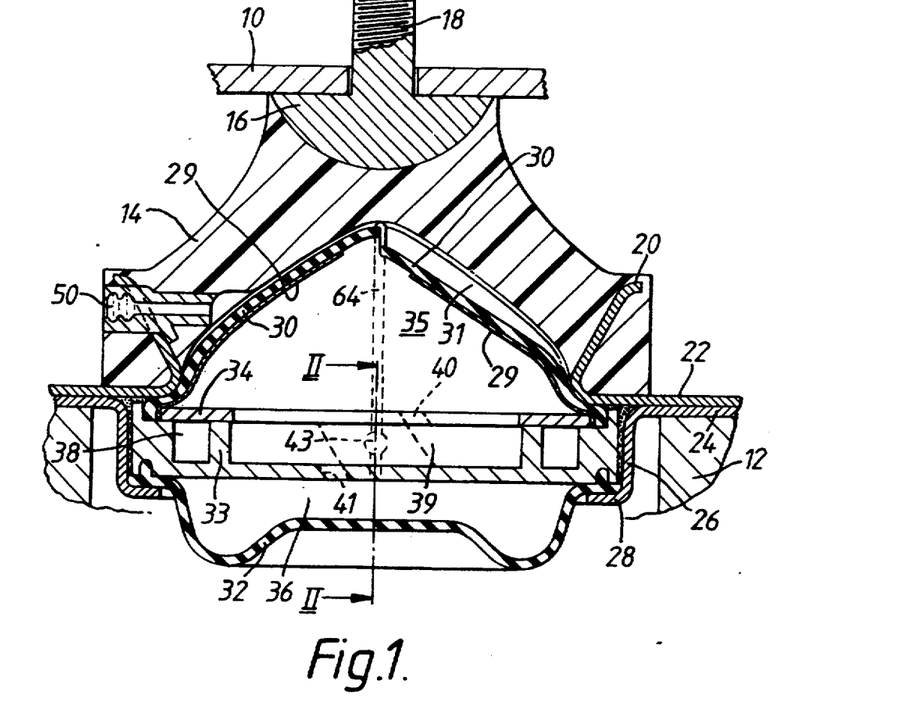
FIG. 1 is a cross-section through one of the support elements.

As shown in FIG. 1, the support element is attached at its upper end to part of the engine 10 of a vehicle and is attached at its lower end to the body 12 of the vehicle. The support element (in conjunction with other elements which may be the same or different) supports the engine with respect to the body and, in a manner to be described, damps the vibration of the engine and reduces transmission of such vibration to the body.

The support comprises an arch-shaped member 14 which is moulded from elastomeric material and is secured to a rigid end piece 16, preferably made of metal. The end piece 16 is integrally connected with a pin 18 which is in turn connected to the motor 10 such as by a screw-threaded attachment.

The arch-shaped member 14 is moulded so as to incorporate a circumferentially extending metal piece 20 which is bent outwardly to form a circumferential reinforcement 22 to provide rigidity and strength. Reinforcement 22 is attached to a flange 24 forming part of a ring-shaped metal piece 26 which defines a radially inwardly directed shoulder 28.

Flanges 22 and 24 are secured to each other, such as by welding, and they in turn are secured by any suitable means to the vehicle body 12.

Mounted within the hollow interior under the arch-shaped piece 14 is a flexible membrane 30. This extends over the entire internal surface of the arch-shaped member 14 to provide a pneumatic chamber 31 between the piece 14 and the membrane 30. In a manner to be explained, the pressure within the chamber 31 can be varied. The membrane 30 is urged against the piece 14 by a leaf spring arrangement 29. FIG. 1 shows, in its left hand half, the position adopted by the membrane 30 when the pressure in the chamber 31 is atmospheric or below atmospheric, and the membrane is consequently urged into contact with the surface of the arch-shaped piece 14 by the leaf spring arrangement 29. In its right hand half, FIG. 1 shows the position adopted by the membrane 30 when the chamber 31 is pressurised above atmospheric. As shown, the pressure overcomes the force exerted by the spring arrangement 29 and urges the membrane 30 away from the piece 14. FIG. 1 simultaneously shows both positions of the membrane 30. In practice, of course, the complete membrane adopts either the position shown in the left hand half of FIG. 1 or its right hand half, depending on the pressure in the chamber 31.

A second flexible membrane 32 is sealingly attached to the shoulder 28.

A rigid channelled member 33 is mounted within the ring-shaped member 26 and supports an annular rigid plate 34. The peripheral edge of the membrane 30, and of the spring arrangement 29, are sealingly secured between the lower face of the flange 22 and the upper face of the plate 34 so as to define an upper chamber 35.

Similarly, the periphery of the membrane 32 is sealed between the shoulder 28 and the lower face of the channel-shaped member 33, so as to define a lower chamber 36. The parts 30,32,33 and 34 can be crimped together in a single operation.

The channel-shaped member 33 defines a circumferentially extending channel 38 and a recess 39.

The chambers 35 and 36 are interconnected via the channel 38. Chamber 35 is connected to channel 38 through an opening 40 (shown dotted) and chamber 36 is connected to channel 38 through an opening 41 (also shown dotted).

Figure 2:
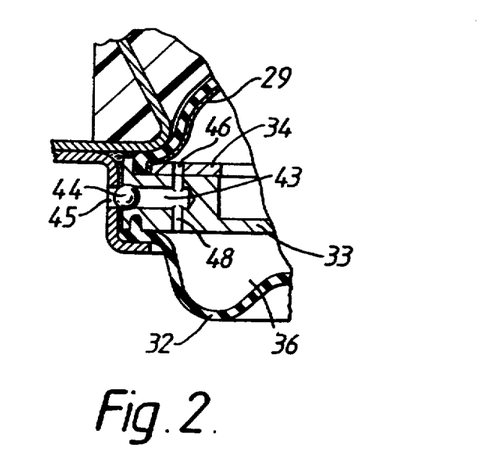
FIG. 2 is a partial section on the line II—II of FIG. 1.

As shown most clearly in FIG. 2, at one position on the circumference, a bore 43 is formed in which is located a ball 44 which sealingly closes off an external opening 45. The bore 43 connects with passageways 46 and 48 which also provide communication between the upper chamber 35 and the lower chamber 36.

The air pressure in the space between the flexible membrane 30 and the inside surface of the arch-shaped member 14 constituting the pneumatic chamber 31 can be varied via a passageway 50 which is connected to a variable air pressure source via a control valve (not shown). The variable pressure source can be a vacuum source which can lower the pressure behind the membrane 30 to below atmospheric pressure. Instead of air, another gas could be used.

The entire interior of the support element is filled with hydraulic fluid. This fluid fills the chambers 35 and 36 and also the circumferential channel 38 (recess 39 as well). Filling with hydraulic fluid is accomplished via the orifice 45 before the ball 44 is place in position; the fluid flows through the passageways 46 and 48 into the chambers 35 and 36 and into channel 38. This filling process takes place with the support element placed on its side so that the orifice 45 is uppermost. This reduces the risk of air bubbles in the fluid. After the filling process, the ball 44 is fixed in the position shown in FIG. 2 to seal of the orifice.

The operation of the support element will now be described.

When the air pressure behind the membrane 30 is low (below ambient pressure), the membrane is held by the spring arrangement 29 in the position illustrated in the left hand side of FIG. 1. The volume of the chamber 31 is thus reduced, possibly to zero. When vibratory movement of the vehicle engine occurs, this is transmitted to the fluid via the arch-shaped member 14 which acts as a piston. The consequent oscillations of this piston cause the hydraulic fluid to oscillate within the channel 38 and between the chambers 35 and 36. Damping is produced by the hydraulic resistance to flow of fluid between the two chambers and by the effect of the fluid resonantly oscillating within the channel 38.

It should be noted that the membrane 32 is very supple and freely expands and contracts in correspondence with movement of the fluid; it thus itself offers little resistance to such fluid movement and the pressure within chamber 36 is maintained substantially at atmospheric pressure.

When the pressure behind membrane 30 is increased (via the passageway 50), however, the membrane 30 is forced away from the inside surface of the arch-shaped member 14, against the spring arrangement 29, as shown in the right hand side of FIG. 1. The volume of chamber 35 is thus reduced and fluid is shifted into chamber 36, which expands (as explained above) without offering substantially any resistance. The damping effect which is now offered against vibrations of the vehicle engine is considerably reduced. This is because the wall of the chamber 35 is no longer substantially rigid but is more flexible-because the membrane 30 is no longer pressed against the piece 14 and is better able to vibrate in correspondence with oscillation of the hydraulic fluid. This to and fro movement is now possible because the outer surface of the membrane 30 is supported on a cushion of air and not by the substantially stiff inside surface of the arch-shaped member 14. The fluid now no longer oscillates within the channel 38 (or only oscillates therein to a small extent). The damping effect produced by such oscillation is therefore stopped or reduced. The overall damping effect produced by the support element is therefore reduced.

Therefore, by controlling the pressure in the pneumatic chamber 31 (that is, between the membrane 30 and the arch-shaped member 14), the damping effect produced by the support element can be adjusted so as to provide optimum damping according to the frequency and magnitude of the vibrations.

The additional interconnection between the chambers 35 and 36 which is provided by the passageways 46 and 48 modifies the total damping effect by reducing its amplitude, tending to flatten the peak of the curve which relates damping amplitude to frequency and to shift this peak towards a higher frequency. In addition, it improves the dynamic response at higher frequencies.

In a modification, however, the ball 44 can be positioned (after filling the support element with hydraulic fluid) to close off the passageways 46 and 48. In this case, the interconnection between chambers 35 and 36 is only via the openings 40 and 41 and channel 38.

High amplitude movements of the vehicle engine can occur due to abrupt changes in torque exerted by or on the engine—for example, when the vehicle starts or abruptly changes speed. Such large amplitude variations have a frequency within the range between 0 and 10 Hz. In order to dampen the effect of such vibrations, the support element needs to exert a strong damping force. Therefore, in this situation the pressure in pneumatic chamber 31 would be reduced to the minimum so that the membrane is in the position illustrated in FIG. 1 in dashed line, thus giving maximum damping effect.

As the vehicle travels along a road, the latter's irregularities will cause vertical movement of the motor on the support element and such movements can have frequencies up to about 20 Hz. Again, a relatively strong damping force is required in order to dampen these movements and therefore the pressure behind the membrane in the pneumatic chamber 31 needs to be low.

When the engine is idling, it creates vibrations in the range between 15 Hz and 25 Hz. In order to avoid transmitting these vibrations, the support element needs to be more supple and the pressure in pneumatic chamber 31 is therefore increased.

The various moving parts within the interior of the engine generate inertial forces producing vibrations in the range between 30 Hz and 300 Hz (or higher). In order to avoid transmitting these vibrations, the support element also needs to be supple. Again, therefore, the pressure in pneumatic chamber 31 will be increased.

Figure 10A:
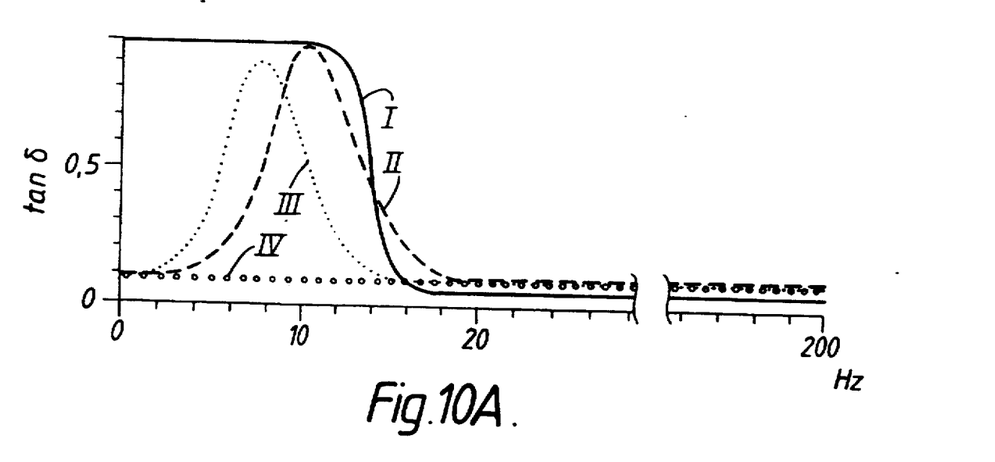
FIGS. 10A and 10B show curves for explaining the operation of the support elements.
Figure 10B:
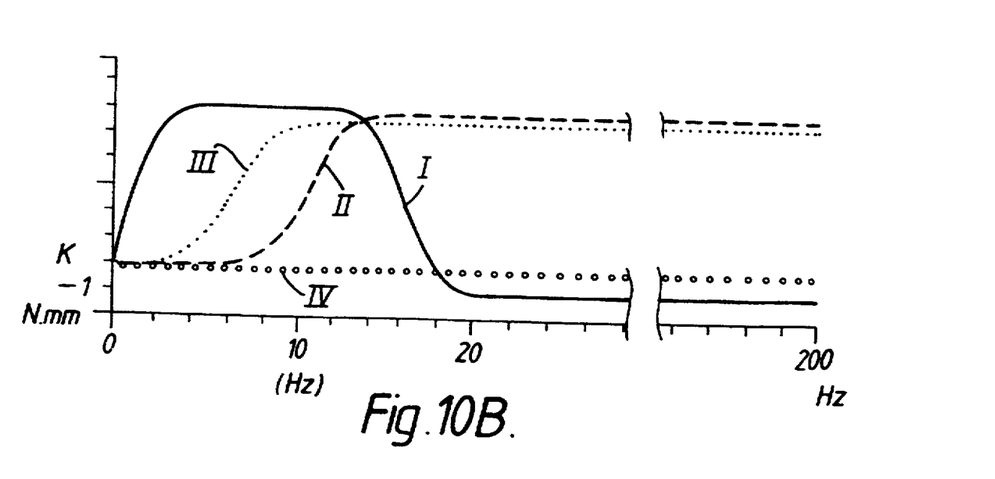

FIG. 10 illustrates the operation graphically. The stiffness of the support element is a complex variable with a modulus K and argument d. In FIG. 10A, the loss factor tan(d) is plotted on the vertical axis and vibration frequency is plotted on the horizontal axis. Curve I illustrates the ideal relationship between loss factor and vibration frequency. At low frequencies, the loss factor is maximum and remains at this maximum value until about 10 Hz, after which it falls rapidly to a minimum value which is maintained for frequencies above about 20 Hz.

Curve II shows the response produced by the support element when the pressure in pneumatic chamber 31 is at its minimum value. As shown, the loss factor rises from a low value at 0 Hz to a maximum (at about 10 Hz) corresponding to the engine suspension's resonant frequency and then reduces. The peak of the curve is produced by the resonance of the fluid oscillating in the channel 38.

Curve III corresponds to curve II but illustrates the case when the pressure in pneumatic chamber 31 is slightly above the minimum value.

Curve IV illustrates the case when the pressure in pneumatic chamber 31 is at its maximum value. The value of loss factor is thus at its minimum level continuously.

In FIG. 10B, the stiffness K is plotted on the vertical axis, and, as before, vibration frequency is plotted along the horizontal axis.

Again, curve I illustrates the ideal case where the resistance to movement is at its maximum value from very low frequencies (just above 0 Hz) to just above 10 Hz and then falls off rapidly to a minimum value which is maintained at frequencies above 20 Hz.

Curve II illustrates the case when the pressure in pneumatic chamber 31 is at its minimum. The stiffness produced by the support element rises rapidly from a low value to a maximum value which is reached at about 15 Hz and is hereafter maintained. Curve III corresponds to Curve II but illustrates the case when the pressure in pneumatic chamber 31 is slightly above the minimum value. Curve III is generally of the same shape as Curve II except that the stiffness rises to its maximum at a lower frequency.

Finally, Curve IV shows the case when the pressure in pneumatic chamber 31 is at its maximum. The resistive force exerted by the support element is at a minimum level.

Figure 9:
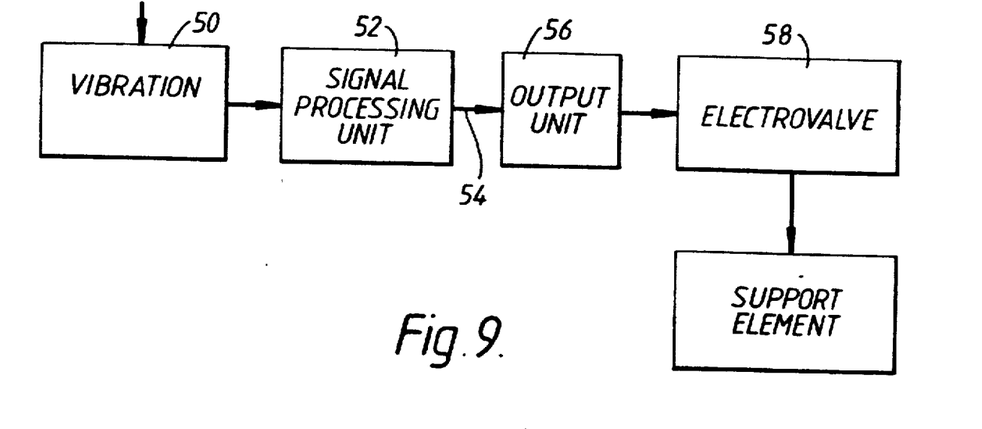
FIG. 9 is a schematic diagram of a control circuit for the support elements.

FIG. 9 illustrates a control circuit for controlling the air pressure in pneumatic chamber 31.

A transducer or sensor 50 senses the vibration to be damped. For example, it may be a vibration sensor for producing an electrical signal in dependence on the vibration (frequency and magnitude) of the vehicle engine. The resultant signal is then processed in a signal processing unit 52 which could be of any suitable type (for example, an amplifier or a micro-processor) so as to produce a control signal on a line 54 which varies according to the magnitude and frequency of the signal produced by the transducer 50 and the resultant damping effect which is required. Control signal 54 operates an output unit 56 which correspondingly controls an electro-valve 58. This controls the pressure applied via passageway 50 behind the membrane 30. The pressure can be applied directly by a pump operated by the control signal 54.

The inside surface of the arch-shaped member 14 is provided with one or more grooves 64. These provide air spaces which exist even when the pressure in pneumatic chamber 31 is reduced to its minimum. The existence of these air spaces helps to ensure that the membrane 30 is deformed away from the arch when the pressure behind it is increased. Instead of grooves, ridges could be used.

Spring arrangement 29 can be made of metal or plastics, for example.

The embodiment of FIGS. 1 and 2 uses channel 38 in which fluid oscillates to provide damping. However, any other arrangement could be used instead for damping vibrations in response to movement of the arch-shaped member 14. Examples of such other damping arrangements are:

(a) a channel having a restriction within it;
(b) the use of an electro-rheological fluid and a passageway passing this fluid between two electrodes which create an electric field increasing the viscosity of the fluid;
(c) the use of an electromagnetic fluid and a passageway passing this fluid through a magnetic field.
(d) the resonance of a dynamic damper constituted by a solid mass.

In each case, an increase of pressure in the pneumatic chamber 31 would serve to divert the fluid from the particular damping arrangement.

Figure 3:
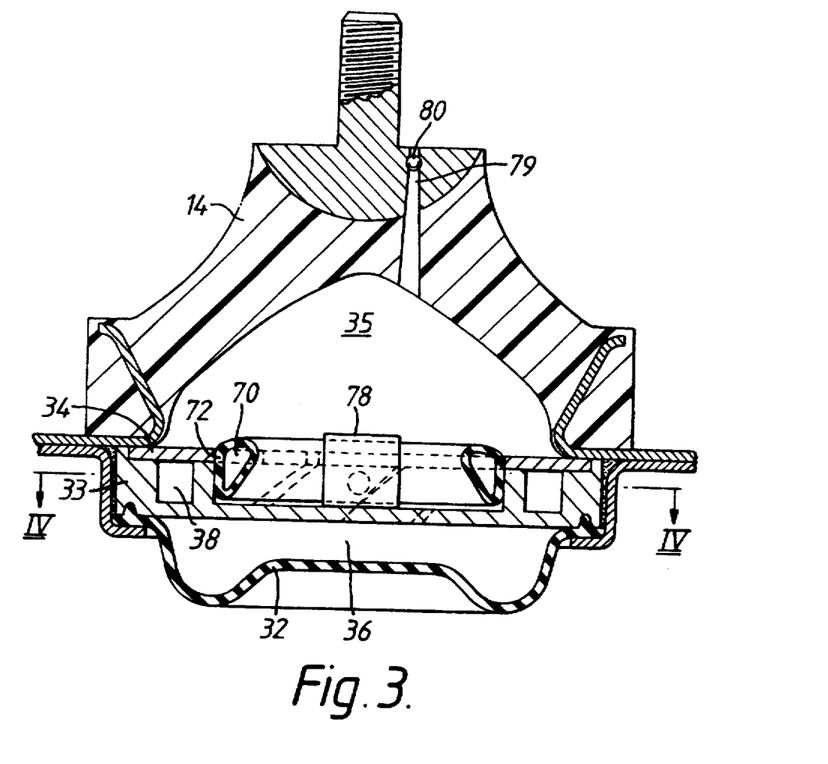
FIG. 3 is a cross-section corresponding to FIG. 1 but through a modified one of the support elements.
Figure 4:
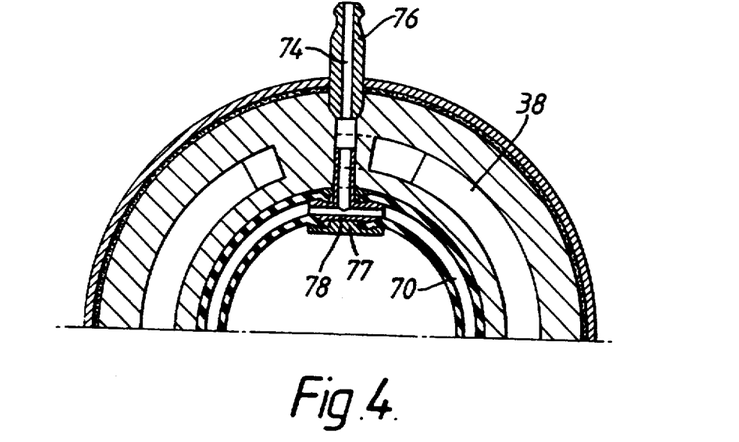
FIG. 4 is a partial section on a line IV—IV of FIG. 3.

In the embodiment of FIGS. 3 and 4, the membrane 30 is replaced by an inflatable annular tube 70. Preferably, the annular tube 70 is produced (such as by extrusion) to have a substantially rigid outer wall 72 which is secured to the wall of the recess 39, the remainder of the tube being made (for example) of more supple material. The fixed wall 72 may be relatively thick to increase its rigidity and the remainder can be thinner or with thin zones to increase its flexibility. The tube may be extruded in one piece by a duplex extrusion process. The air or gas pressure within the tube 70 is adjusted by means of a valve (not shown) controlling the application of air or other gas pressure from a variable pressure source to the interior of the tube 70 via a passageway 74. The passageway 74 extends from outside the support element through an end piece 76 and is connected to the interior of the tube 70 via a T piece 78. The tightness between tube 70 and T-piece 78 is obtained by means of a component 77 which holds them together and which could be an over-moulded piece for example.

The operation is otherwise the same as already described. When the pressure within tube 70 is at its minimum, the volume of the tube is also at its minimum and the support element provides maximum resistance to vibration. However, when the pressure within tube 70 is increased, the resistive force exerted by the support element is reduced because oscillations of the hydraulic fluid within chamber 35 can be at least partially absorbed by corresponding oscillations of the flexible wall of the tube 70 against the air pressure within it.

Initial filling of the interior of the support element with hydraulic fluid is achieved via a passageway 79 which is afterwards sealed off by a ball 80.

Figure 5:
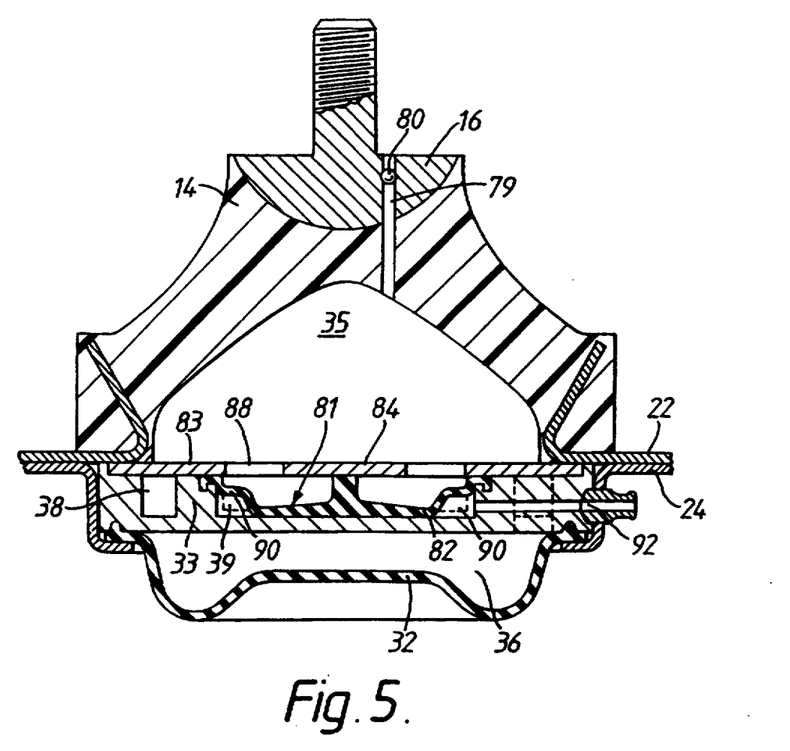
FIG. 5 is a cross-section corresponding to FIG. 1 but through a further one of the support elements.

In the embodiment of FIG. 5, the membrane 30 of FIG. 1 is replaced by a membrane 81 whose central part is in the form of a relatively stiff disk 82 which is supported on the base of the recess 39. The cover plate 83 is different from the cover plate 34 of the embodiment of FIGS. 1 and 2: the cover plate 83 in FIG. 5 has a central portion 84 together with a series of apertures 88, and the central portion 84 is contacted by an extension 86 of the disk portion 82.

The disk portion 82 of the membrane 81 is integral with a peripheral flexible portion 90 whose peripheral edge is anchored in the wall of the recess 39. The air or gas pressure under the flexible peripheral portion 90 of the membrane 81 can be varied (in the manner already described) via a passageway 92.

The operation is otherwise as already described.

Figure 6:
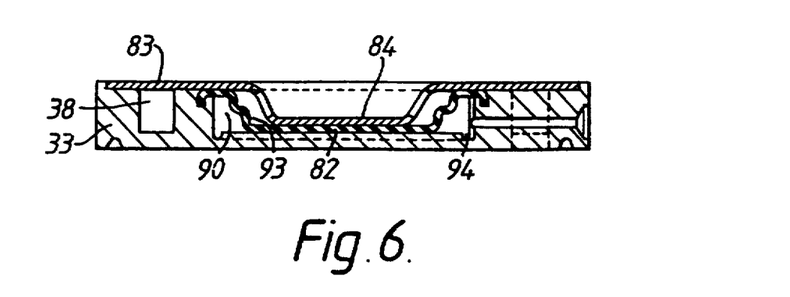
FIG. 6 is a cross-section corresponding to part of FIG. 5 but showing a modification.

FIG. 6 shows a modified form of the embodiment of FIG. 5. In FIG. 6, the membrane 30 of FIG. 1 is replaced by a membrane 93. The cover plate 83 is disk-shaped and its central portion 84 holds the central disk portion 82 of the membrane 93 against the base of the recess 39. The operation is otherwise as already described.

FIG. 6 shows how a small groove 94 can be provided around the base of the recess 39. This groove ensures that there is always a small space between the wall of the recess 39 and the membrane 93, even when the pressure under the membrane is reduced to the minimum. Under such minimum pressure conditions, the flexible portion of the membrane 90 will be drawn by suction against the wall of the recess 39, but the groove 94 will continue to provide a small separation. This helps to ensure that the flexible part 90 of the membrane can be rapidly expanded when the pressure under it is increased.

In the embodiments of FIGS. 3 to 6, passageways 46 and 48 similar to those in FIG. 2 can be provided to interconnect chambers 35 and 36 and thus to modify the damping effect in the manner explained. However, these passageways would not be used for initial filling with hydraulic fluid (this is carried out via passageway 79).

Figure 7:
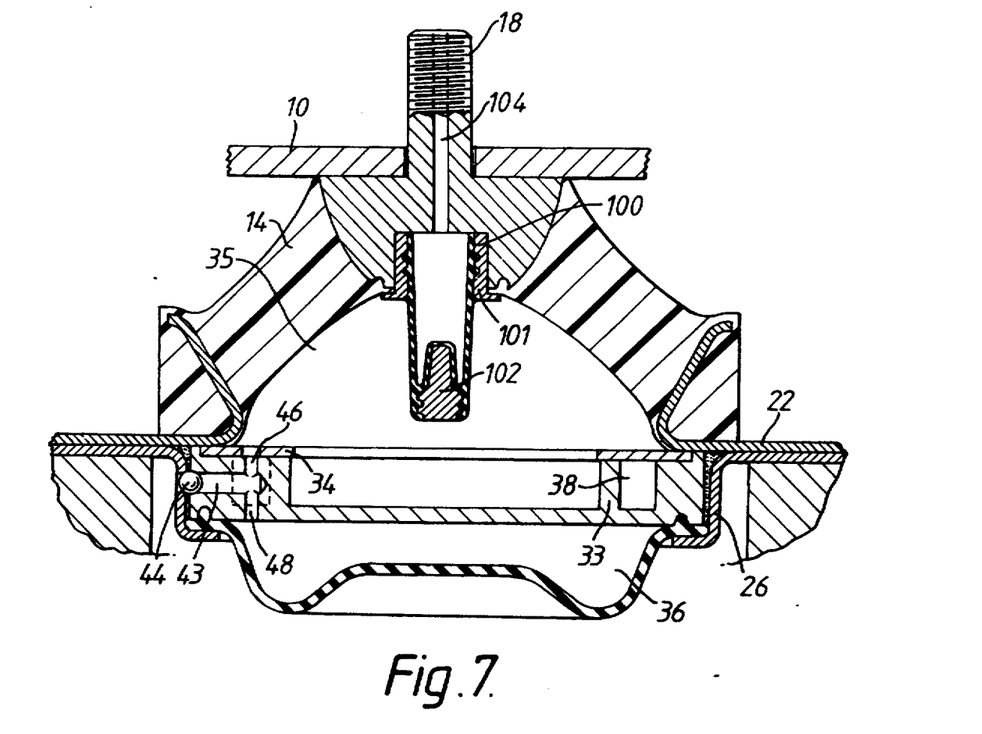
FIG. 7 is a cross-section corresponding to FIG. 1 but through a further one of the support elements.

In the embodiment shown in FIG. 7, the membrane 30 of FIG. 1 is replaced by a membrane 100 which is (for example) in the form of a closed-end tube depending downwardly from, and sealed within, the rigid end piece 16 of the support element via piece 101. The membrane 100 may have a rigid and heavy member 102 at its closed off end to act as a dynamic damper or to facilitate the fitting of membrane 100. The air pressure within the closed-off tube 100 is controlled (in the manner already described) via a passageway 104 extending through the pin 18.

The operation is otherwise as already described.

In the embodiment of FIG. 7, filling of the support element with hydraulic fluid is achieved by means of orifice 45 in the same way as for the embodiments of FIGS. 1 and 2.

Figure 8:
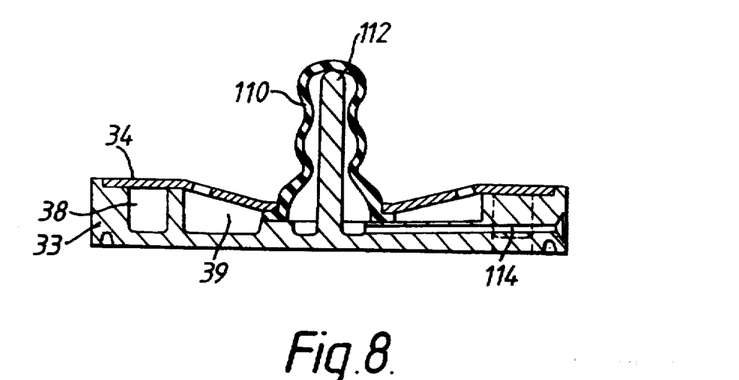
FIG. 8 is a cross-section corresponding to part of FIG. 5 but showing further modifications.

In the embodiment of FIG. 8, the membrane is of the same general form as shown in FIG. 7—that is, in the form of a closed-off tube or balloon 110. In this case, however, the tube is supported on an integral pin 112 extending upwardly from the base of the recess 39 in the channel member. The pressure within the interior of the closed-off tube 110 is controlled (in the manner already described) via a passageway 114. Again, the operation is as already described. In the embodiment of FIG. 8, passageways 46 and 48 similar to those in FIG. 2 can be provided to interconnect chambers 35 and 36 and thus to modify the damping effect in the manner explained.

The pneumatic chamber defined by the flexible membrane (e.g. 30,70,90,100) can be inflated with a pressure above 1 bar in order to compensate for the pressure slightly above atmospheric pressure caused by stretching of the membrane 32 due to the weight of the engine, and also to provide a sufficient volume behind the flexible membrane to produce low damping.

In the case of FIGS. 3,5,6,7 and 8, the flexible membrane 70,90,100 or 110 of the pneumatic chamber can have a form and rigidity such that, after inflation by application of a pressure equal to or above 1 bar, the flexible membrane comes into contact with the piston constituted by arch 14. This reduces the effective pulsating surface of this piston and hence allows a lesser volume of fluid to move, producing a reduction of vibration transmissibility at higher frequency and improved uncoupling of the damping arrangement.

The support elements described can be modified for use as hydroelastic torque reaction links and also as hydroelastic damping arrangements providing damping in more than one axis (for example, hydroelastic bushes).

In a modified form of the embodiment disclosed in FIG. 1, the pressure in the pneumatic chamber 31 defined by the flexible membrane e.g. 30 (FIG. 1) can be fixed instead of variable, so as to provide a fixed degree of damping and stiffness. The other embodiments can be modified in the same way.

I claim:

1. A vibration-damping support for acting between two members between which it is connected in use so as to dampen transmission of vibrations between them, comprising wall means defining chamber means for containing hydraulic fluid, means responsive to the said vibrations for acting on the liquid within the chamber means so as to tend to move it, damping means resisting such movement of the fluid whereby to provide damping of the vibrations, a portion of the wall means being flexible to affect the magnitude of the vibration damping, and control means for controllably varying the flexibility of the said flexible portion of the wall means whereby to vary the magnitude of the vibration damping, the control means comprises means resiliently urging the said portion of the wall means against a substantially rigid surface, and gas pressure means for applying controllable gas pressure between the rigid surface and the adjacent surface of the said portion of the wall means.

2. An arrangement according to claim 1, in which the gas pressure means is operative in dependence on the said vibrations.

3. A support according to claim 2, in which the means for controlling the gas pressure includes
   transducing means for producing a control signal in dependence on the magnitude or the frequency of the vibrations, and
   means operative in dependence on the control signal to control the gas pressure.

4. A support according to claim 1, in which the gas pressure is variable to a value below atmospheric pressure.

5. A support according to claim 1, in which the said gas pressure is variable to a value above atmospheric pressure.

6. A support according to claim 1, in which the flexible wall portion comprises a flexible membrane which extends over the substantially rigid surface which is outside the chamber means.

7. A support according to claim 1, in which the control means includes spring means within the chamber and acting on the wall portion.

8. A support according to claim 7, in which the spring means comprises leaf spring means.

9. A support according to claim 1, including a mechanical formation on one said surface to preserve a gas space between the surfaces even when the gas pressure is a minimum.

10. A support according to claim 1, in which the substantially rigid surface is the inner surface of a movable member connected to one of the said mechanical elements so as to move therewith.

11. A support according to claim 10, in which the movable member is a member defining a conical surface constituting the said substantially rigid surface.

12. A support according to claim 1, including a mass carried by the said flexible portion of the wall means.

13. An arrangement according to claim 1, in which the damping means comprises a passageway for the fluid in which the fluid can resonantly oscillate.

14. An arrangement according to claim 1, in which the damping means includes a fluid passageway having a restriction for the flow of fluid therein.

15. A support according to claim 1, in which the damping means comprises means for subjecting the fluid to an electric or magnetic field and in which the fluid is adapted such that its flow is reduced by such field.

16. A support according to claim 1, in which the chamber means is divided into two parts one of which includes the said flexible wall portion and the other of which has a volume which adjusts to the volume of hydraulic fluid in it without offering substantially any resistance to the entry of such fluid, the fluid passing between the two parts of the chamber means via the damping means.

17. A controllable engine mount for a vehicle for damping the transmission of vibrations between the engine and the body of the vehicle, comprising:
   first and second fixtures for respective connection to the engine and the body;
   a hollow member having an internal conically shaped surface made of relatively stiff material the apex of which is connected to one of the fixtures and the base of which is connected to the other thereof;
   a flexible wall closing off the base of the conically shaped member so as to define therewith a chamber for filling with hydraulic liquid;
   separating means in the chamber and between the conically shaped member and the flexible wall to separate the chamber into first and second chamber portions the first of which is positioned between the separating means and the conically shaped member and the second of which is positioned between the separating means and the flexible wall;
   the separating means including a hydraulic fluid passageway connecting the two chamber portions and including fluid damping means such that flexing of the conically shaped member in dependence on vibrations causes movement of liquid between the two chamber portions which movement is restricted by the damping means thereby damping the vibrations;
   a flexible membrane at least partially defining the volume of the first chamber portion, the flexible membrane having one of its surfaces in contact with the fluid;
   the flexible membrane being mounted with its opposite surface adjacent to the said conically shaped surface,
   resilient spring means urging the flexible membrane against the conically shaped surface, and
   control means for applying a variable gas pressure between the conically shaped surface and the membrane, so as to vary the flexibility of the membrane and thus to control the damping effect produced by movement of the hydraulic fluid and the stiffness.

18. A support according to claim 17, including a mechanical formation on the conically shaped surface to preserve a gas space between the conically shaped surface and the membrane even when the gas pressure is a minimum.

* * * * *